L. Zimmerman.
Sharpening Mach.
Nº 93,031. Patented Jul. 27, 1869.
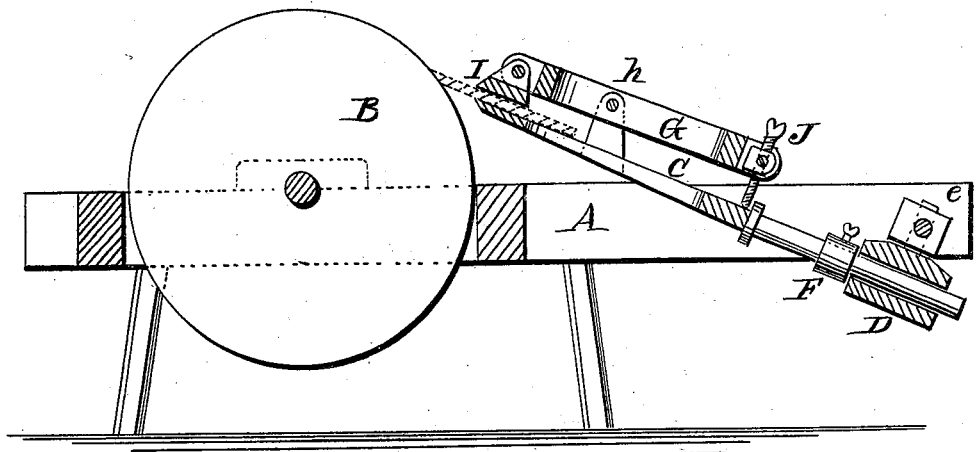
Witnesses:
Hinchman
Mott Brooks
Inventor:
L. Zimmerman
Per Munn & Co.
Attys

United States Patent Office.

LORENZO ZIMMERMAN, OF WAKESHMA, MICHIGAN.

Letters Patent No. 93,031, dated July 27, 1869.

IMPROVEMENT IN GRINDING EDGE-TOOLS.

The Schedule referred to in these Letters Patent and making part of the same.

*To all whom it may concern:*

Be it known that I, LORENZO ZIMMERMAN, of Wakeshma, in the county of Kalamazoo, and State of Michigan, have invented a new and useful Improvement in Grinding Edge-Tools; and I do hereby declare that the following is a full, clear, and exact description thereof, which will enable others skilled in the art to make and use the same, reference being had to the accompanying drawings, forming part of this specification.

This invention relates to a new and useful apparatus for holding edge-tools, in grinding them, on a grindstone; and consists in an adjustable bar, connected with the frame of the grindstone at its back end, with an adjustable lever attached thereto, with a jaw on the end of the lever, for holding the tool to the bar and to the stone, arranged as hereinafter more fully described.

The accompanying drawing represents a vertical longitudinal section of a grindstone-frame, showing the stone, and my improved clamp for holding the tool as when in use.

Similar letters of reference indicate corresponding parts.

A is the grindstone-frame.

B represents the stone.

C is the bar or main portion of the clamp, which constitutes my invention, and is made of metal.

This bar C is attached to the frame of the grindstone, by means of the wooden socket-piece D, which is pivoted to the frame, as seen at *e*. The end of the bar is round in the socket, so that it may be turned or partially rotated therein.

F is an adjustable collar on the round part of the bar, fastened by a set-screw, to govern the position (longitudinally) of the bar in the socket.

G is a metallic lever, the fulcrum of which is at *h*, on an ear attached to the bar C.

I is a jaw, pivoted to the end of the lever G. The tool to be ground is placed between the bar and this jaw, where it is seen in red color in the drawing.

It is fastened in place and firmly held by means of the set-screw J, which passes through the lever with a screw-thread, and bears upon the top of the bar, as seen in the drawing.

It will be seen that the bar and the lever are so combined and arranged, that any description of edge-tool may be held, and that by adjusting the bar in the socket, any desired bevel may be obtained on the tool.

Pressure or weight is put upon the clamp in grinding, if necessary.

The tool being rigidly held on the stone, will be much more easily ground than it can be when held by hand, in the ordinary manner.

Having thus described my invention,

I claim as new, and desire to secure by Letters Patent—

In combination with a grindstone, the bar C, socket D, lever G, and jaw I, constructed, arranged, and operating substantially as herein shown and described, for the purposes set forth.

LORENZO ZIMMERMAN.

Witnesses:
SAMUEL C. ROSENBERRY,
SYLVESTER FREDENBURGH.